(No Model.) 2 Sheets—Sheet 1.
H. W. HARNED.
ATTACHMENT FOR THRASHING MACHINES.
No. 557,673. Patented Apr. 7, 1896.

(No Model.) 2 Sheets—Sheet 2.

H. W. HARNED.
ATTACHMENT FOR THRASHING MACHINES.

No. 557,673. Patented Apr. 7, 1896.

Witnesses

Inventor
Harrison W. Harned
By Burton H. Roucks
his Attorney

UNITED STATES PATENT OFFICE.

HARRISON W. HARNED, OF IONIA, IOWA.

ATTACHMENT FOR THRASHING-MACHINES.

SPECIFICATION forming part of Letters Patent No. 557,673, dated April 7, 1896.

Application filed January 4, 1896. Serial No. 574,300. (No model.)

*To all whom it may concern:*

Be it known that I, HARRISON W. HARNED, a citizen of the United States, residing at Ionia, in the county of Chickasaw and State of Iowa, have invented certain new and useful Improvements in Attachments for Thrashing-Machines; and I do hereby declare the following to be a full, clear, and exact description of the invention, such as will enable others skilled in the art to which it appertains to make and use the same.

My invention relates to grain-separating machines, and especially to the class of thrashing-machines which are used in connection with a feeder, the essential object of the invention being to provide such machines with an attachment in the form of a shaking conveyer or pan which is suspended in such position below the frame proper that the trash, heads, and loose grain, which leak over the sides of the usual vibrating grain-feeding pans or conveyers and drop through the spaces between the sides of the frames of such pans or conveyers and fall upon the ground, may be caught and saved by conducting them to the shaking conveyer of the separator proper.

My invention consists of an independent and removable pan or conveyer pivotally suspended from the frame of the machine below the usual grain-feeding devices and receiving a vibrating or shaking motion from the conveyer, screen, or riddle of the separator, and placed in such relation to the usual grain-feeding pans or conveyers that trash, heads, and loose grain leaking over the sides of such feeding devices are caught and conducted to said shaking separator.

My invention also consists of the constructions and combinations of devices hereinafter fully described and claimed.

Figure 1:
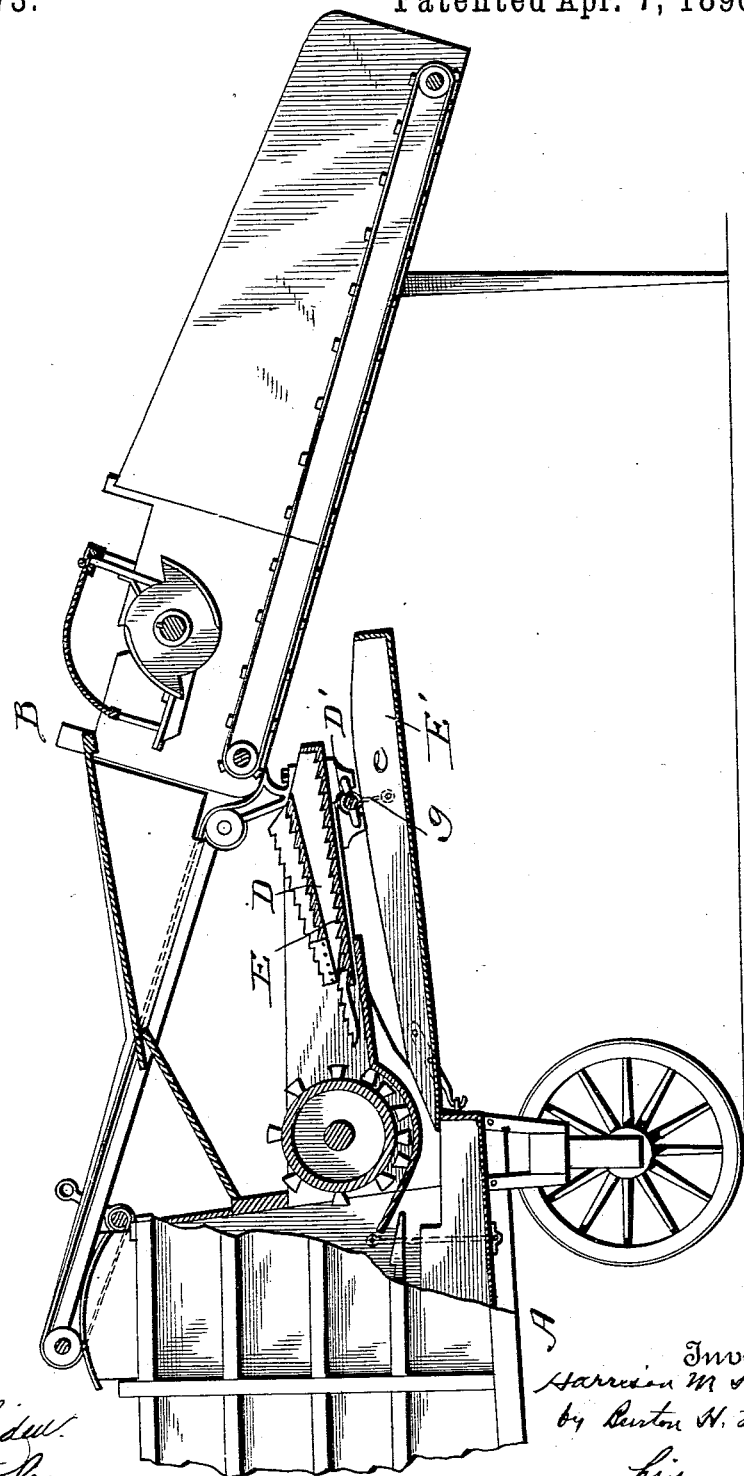
Figure 2:
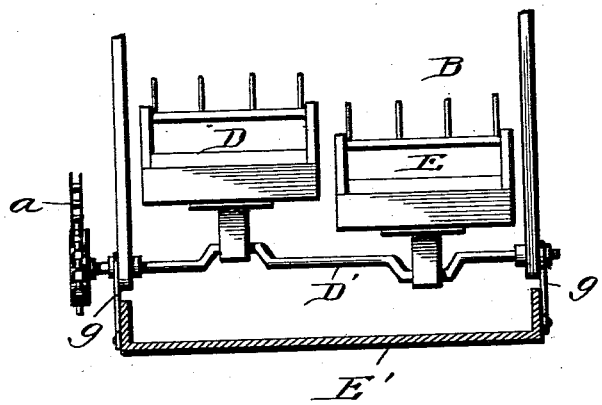
Figure 3:
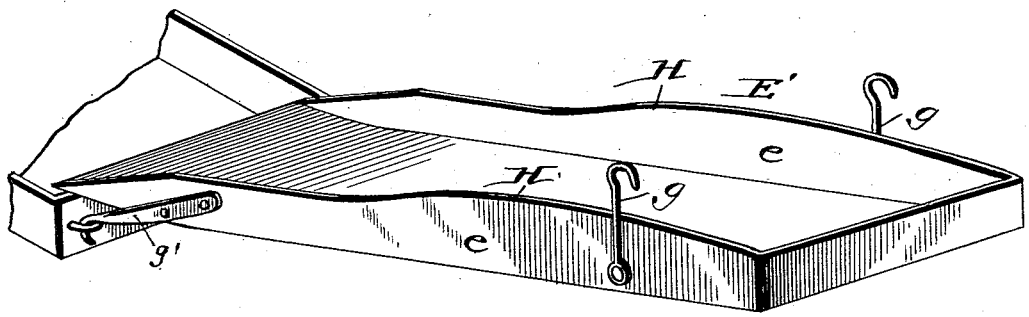

In the accompanying drawings, Figure 1 represents a part elevation and a part sectional view of a well-known form of thrashing-machine and band-cutter and feeder with my improvement attached. Fig. 2 is a front end view of a part of grain-feeding pans or conveyers, their crank-shaft, by which they are vibrated, and my supplemental shaking pan or attachment overlapping the plane of the outer sides of the feeding pans or conveyers to catch the leakage over the sides of the latter. Fig. 3 is a perspective view of the supplemental pan, showing the suspending devices.

In the accompanying drawings, A represents a thrashing-machine of any well-known form having complementary devices for thrashing and separating the grain, and B represents a feeder and band-cutter of well-known form. These machines, being of any well-known and approved type and forming no part of the present invention, are not specifically described or illustrated in detail.

The feeder and thrashing-machine are connected in the usual manner, and in the type of machines illustrated herein there is interposed between the two machines one or more grain-feeding pans or conveyers D and E, having teeth or serrations to engage the grain received from the feeder and advance it to the thrashing-machine cylinder and concave, as usual. These grain-feeding pans are mounted at or near the receiving end upon a crank-shaft D', which may receive its motion from a band or chain $a$ running from one of the rollers or shafts of the feeder-belt to a pulley upon said crank-shaft, whereby the pans or conveyers are given a vibrating motion to accelerate the feed of the grain forward.

In machines of the type thus far described some of the trash, heads, and loose grain which leak between the feeder and thrashing-machine will be caught by these shaking conveyers and saved; but as there is considerable leakage over the sides of the pans or conveyers it is evident that all such matter leaking at these points will fall to the ground and be lost and cause a lot of litter which must be cleaned up. It is the purpose of my present invention to save these heretofore-wasted portions and conduct them directly to the shaking separator of the thrashing-machine, and in carrying out the invention I construct a supplemental pan or conveyer E' of a suitable wood frame $e$ and a sheet-metal or other closed bottom, the lower end of which is in open communication with the conveyer or separator.

The supplemental pan is provided at or near opposite ends with hooks or equivalent hangers, one pair of which, $g$, is adapted to hook over the crank-shaft D', while the opposite pair, $g'$, is made to engage eyes or similar means on the adjacent end of the shaking conveyer or separator, whereby the latter imparts its motion to the frame. This supplemental pan or conveyer is open at its inner end, and it is preferably hung at an inclination, with its side walls overlapping the plane of the outer sides of the main pans or conveyers, as shown in Fig. 2, and to facilitate the catching of all matter that leaks over the sides of the main pan the sides of the supplemental pan may be provided with wings H, as shown in Fig. 3. This supplemental pan is a mere attachment for the thrashing-machines now in use. It may be extensible to accommodate itself to various sizes of machines, and it is readily placed in position and removed by reason of its hook-shaped suspending-rods.

Having thus described my invention, what I claim as new, and desire to secure by Letters Patent, is—

The combination, with a thrashing-machine having a vibrating grain-feeding conveyer, of an inclined supplemental pan below the frame of the feed end of the machine having hooks at its outer end adapted to detachably hook over the shaft of the grain-feeding conveyer and having its lower end open to discharge directly into the shaking conveyer of the separator, and provided with hooks to detachably connect it with said shaking conveyer so that the supplemental pan is vibrated thereby, said pan having a width greater than the width of the feeding-conveyers and adapted to catch the leakage over the sides of the conveyer and direct the same directly into the conveyer of the separator.

In testimony whereof I affix my signature in presence of two witnesses.

HARRISON W. HARNED.

Witnesses:
WILLIAM H. CHASE,
FRANKLIN J. BADGER.